US005423350A

United States Patent [19]

Zinck

[11] Patent Number: 5,423,350

[45] Date of Patent: Jun. 13, 1995

[54] AIR MOTOR REVERSING THROTTLE

[76] Inventor: Frederick L. Zinck, 600 S. Elmwood Ave., Glenolden, Pa. 19036

[21] Appl. No.: 258,057

[22] Filed: Jun. 10, 1994

[51] Int. Cl.$^6$ .............................................. F16K 11/00

[52] U.S. Cl. ............................ 137/625.48; 137/614.11

[58] Field of Search ............... 137/613, 614.11, 625.48

[56] References Cited

U.S. PATENT DOCUMENTS

| | | | |
|---|---|---|---|
| 1,620,315 | 3/1927 | Boher | 137/614.11 X |
| 1,630,947 | 5/1927 | Jenhs | 137/614.11 X |
| 2,899,935 | 8/1959 | Dalton | 121/21 |
| 3,101,096 | 8/1963 | Frazer-Hosh | 137/614.11 X |
| 3,326,240 | 6/1967 | McConnaughay | 137/637.4 |
| 3,590,875 | 7/1971 | Northcutt | 137/630.14 |

*Primary Examiner*—John Fox

[57] ABSTRACT

A reversing and throttling device primarily used in pneumatic hand tools is disclosed. Pressurized air enters the housing at one end. An operator depresses a lever at either end to actuate a slide valve which directs and limits the flow of air for reversing and throttling an air motor for powering various pneumatic hand tools.

3 Claims, 3 Drawing Sheets

AIR MOTOR REVERSING THROTTLE

BACKGROUND OF THE INVENTION

1. Field of the Invention

This invention relates generally to pneumatic powered hand tools. In particular, this invention relates to the reversing and throttling of such pneumatic tools.

2. Description of the Prior Art

Conventional pneumatic tools commonly used in assembly operations, dissassembly operations, and automotive repair facilities utilize a lever to actuate an air motor which provides the power for various pneumatic hand tools, i.e. drill, screw driver, ratchet, impact wrench. Reversal of these air tools requires the actuation of a second lever or button thus requiring a second hand. Throttling of these air tools is generally accomplished by adding a restrictor valve to control the air flow. Air flow control is not smoothly varied as the restrictor valve requires continuous adjustment.

SUMMARY OF THE INVENTION

In accordance with the present invention, a single lever is actuated to reverse and throttle various pneumatic hand tools. An operator depresses a lever connected to a slide valve which directs and limits the flow of pressurized air. By directing the flow of pressurized air with a single lever an air motor can be reversed quickly with one-hand operation. Such a device can easily reverse stuck drill bits or cross-threaded fasteners using one hand. Torquing such fasteners can also be more easily accomplished by limiting air flow with one hand. Varied speeds can be easily maintained with one lever. A minimul number of parts is required in the present invention.

DESCRIPTION OF THE PREFERRED EMBODIMENT

Figure 1:
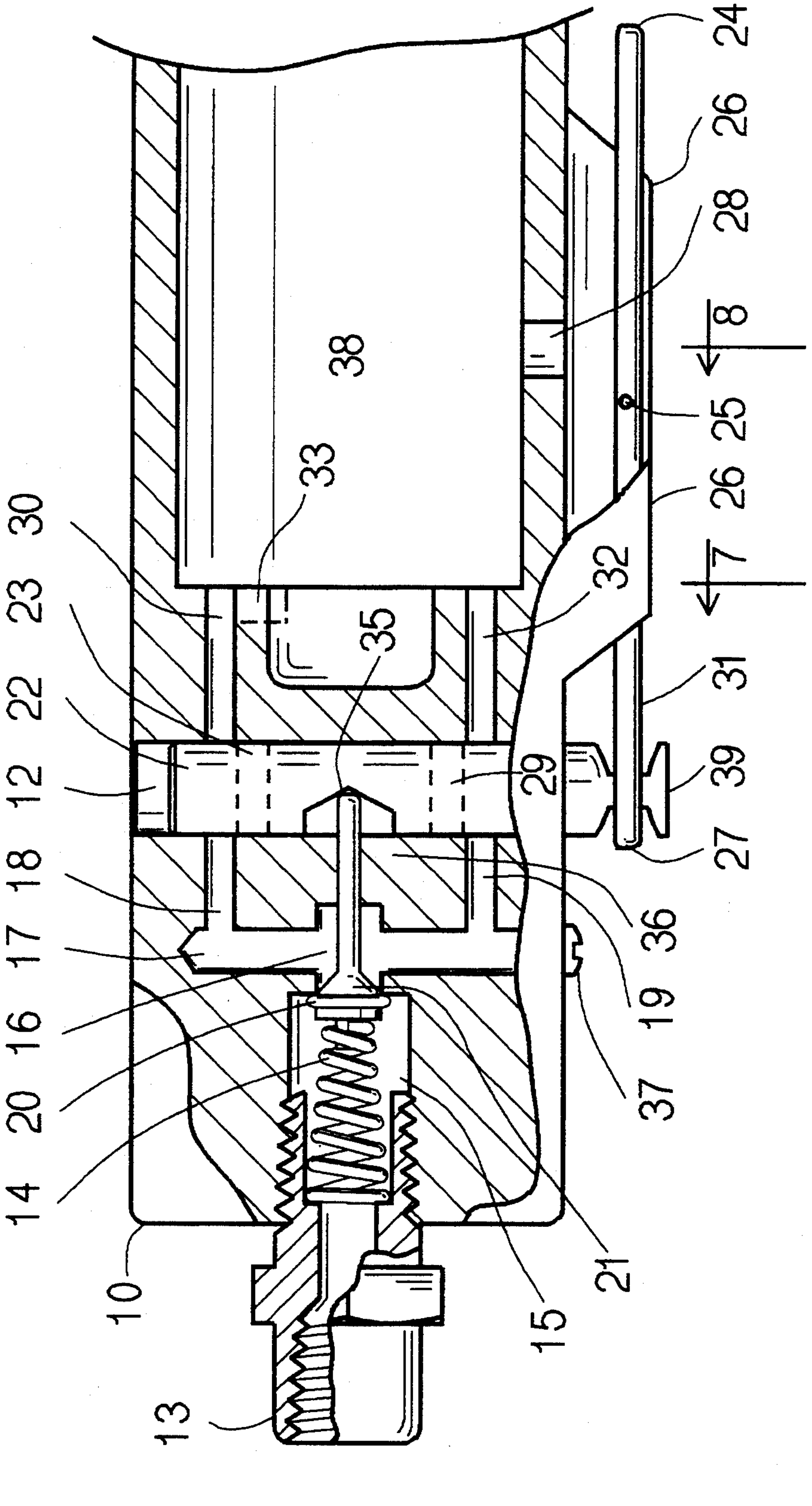
FIG. 1 is a partial right side sectional view of the present invention which incorporates the reversing and throttling device in its neutral position.

Referring to FIG. 1, the present invention, being a reversing and throttling device for pneumatic powered hand tools, includes a housing 10 having a holding means 26. The housing 10 has an inlet counterbore 15 extending axially inward in one end. A smaller diameter inlet counterbore 16 extends axially inward from the inlet counterbore 15. A plunger guide bore 36 extends axially inward from the smaller counterbore 16. An air passage 17 perpendicularly communicates with the smaller counterbore 16 and terminates near one end of housing 10 circumference and its other end is terminated by air stoppage means 37. Air channel 18 communicates perpendicularly with air passage 17 near its terminated end. Air channel 19 communicates perpendicularly with air passage 17 near its stoppage means end. Air channels 18 and 19 extend along the longitudinal axis of housing 10 and communicate perpendicularly with a valve guide bore 12. Valve guide bore 12 terminates near housing 10 circumference past air channel 18 and is exposed at housing circumference past air channel 19. An air channel 30 in alignment with air channel 18 intersects valve guide bore 12 on the opposite side of air channel 18 and is in communication with air chamber 33. Air channel 32 in alignment with air channel 19 intersects valve guide bore 12 on the opposite side of air channel 19 and communicates with air chamber 34. Air chamber 33 extends radially downward along the inside circumference of housing 10 and provides communication between air channel 30 and an air motor 38. Air chamber 34 extends radially upward along inside circumference of housing 10 and provides communication between air channel 32 and an air motor 38. Air chambers 33 and 34 are in non-communication. Valve guide bore 12 slidably receives a valve 22 which has air passage means 23 near terminated end of valve bore 12 radially inward from air channels 18 and 30 and air passage means 29 near valve bore 12 exposed end radially inward from air channels 19 and 32. Aforementioned assumes invention is in neutral position wherein valve 22 causes non-communication of all air channels. Valve 22 has a v-shaped notch 35 in axial alignment with plunger guide bore 36 wherein the pointed portion points away from plunger guide bore 36 and toward an air motor 38. A plunger 21 is slidably received by guide bore 36 wherein the plunger 21 small end contacts the pointed end of the v-shaped notch 35. A sealing means 20 is annularly connected to the large end of plunger 21 wherein the sealing means 20 keeps the plunger 21 partially disposed in counterbore 15 thus sealing counterbore 16 from pressurized air. A tension member 14 tensions the large end of plunger 21 against counterbore 16. Opposite end of tension member 14 is tensioned against an inlet member 13 which is fastened to housing 10 at inlet of counterbore 15. Valve 22 has pivotal linkage means 39 linked to one end of throttle lever 31. Throttle lever 31 is pivotally linked to holding means 26 near their centers by pivot pin 25. Exhaust means 28 communicates air motor 38 with atmosphere.

OPERATION OF THE PREFERRED EMBODIMENT

Figure 2:
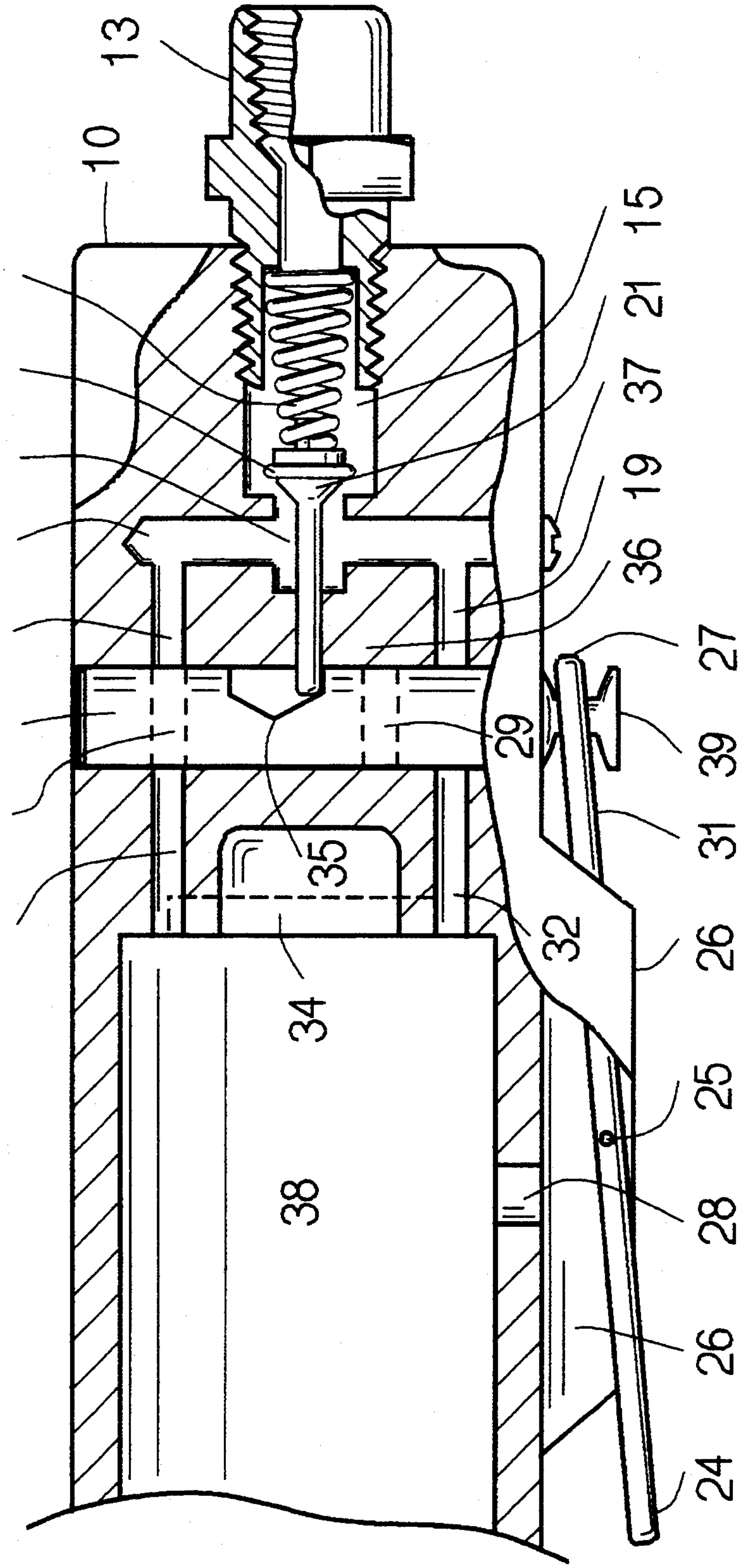
FIG. 2 is a sectional view of the reversing and throttling device in its full throttle position for counterclockwise rotation of an air motor.
Figure 4:
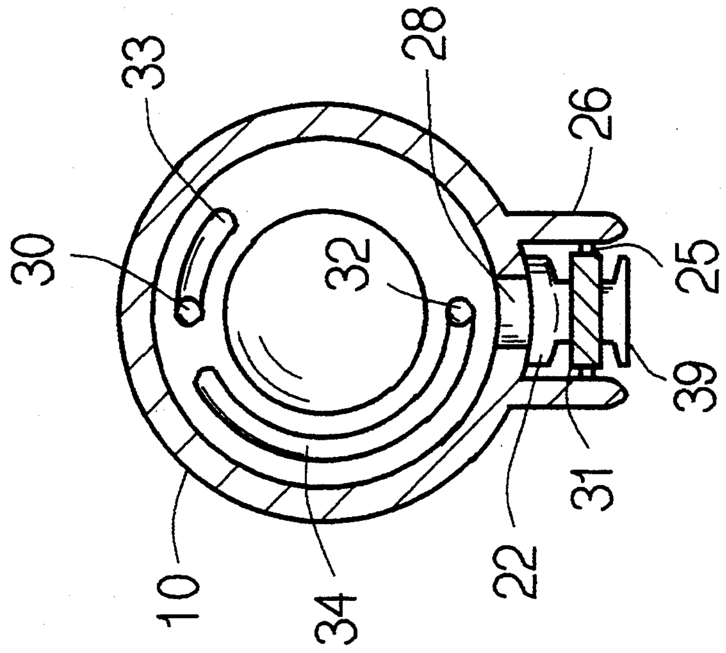
FIG. 4 is a section taken along line 8—8 of FIG. 1 with the air chambers, air channels and exhaust means shown.
Figure 3:
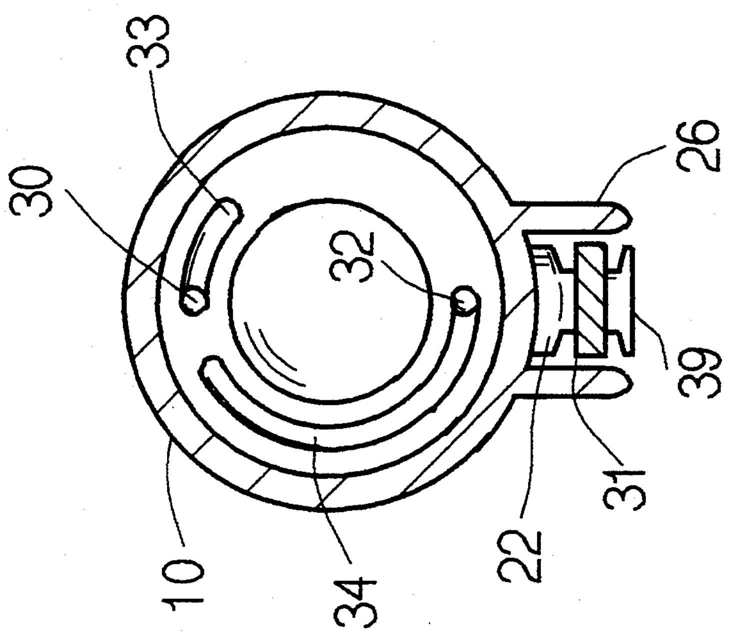
FIG. 3 is a section taken along line 7—7 of FIG. 1 exposing both air chambers and air channels.

Pressurized air generally between 100 and 150 pounds per square inch, is supplied from a suitable air source through inlet member 13 thus maintaining constant pressure in counterbore 15 (FIG. 1). Referring to FIG. 2, when throttle lever 31 is depressed at end 27, valve 22 is forced further into counterbore 12 causing the upper air passage 23 to come into alignment with air channels 18 and 30. Movement of valve 22 also causes plunger 21 and sealing member 20 to move toward inlet member 13 by actuation means 35 allowing for pressurized air within counterbore 15 to enter smaller counterbore 16, air passage 17, and air channels 18 and 19.

Plunger guide bore 36 maintains axial alignment of plunger 21. Since air passage 23 is in alignment with air channel 18, pressurized air flows into air channel 30. Non-alignment of air passage 29 with air channel 19 keeps pressurized air from flowing to air channel 21. Pressurized air enters air chamber 33 enabling the operation of an air motor in counterclockwise direction as viewed from inlet member 13. The amount of deflection of throttle lever 31 determines the volume of air flow by controlling the degree of alignment of air passage 23 with air channels 18 and 30. Depression of throttle lever 31 at its opposite end 24 causes the opposite to occur. Pressurized air again enters smaller counterbore 16, air passage 17, air channels 18 and 19. Amount of deflection of throttle lever 31 causes a degreed alignment of air passage 29 with air channels 19 and 32 allowing for controlled air flow into air chamber 34. Air passage 23 is now in nonalignment with air channels 18 and 30 thus halting air flow thereof. Air motor can now rotate in clockwise direction. Once pressurized air has traveled through an air motor 38 it can now be exhausted through exhaust chamber 28. The reversing throttle remains in neutral position until throttle lever 31 is depressed at either end. Air flows into air chamber 33 or 34 depending upon whether the throttle lever 31 is depressed at end 27 or end 24 respectively. Tension member 14 maintains the device in neutral position when throttle lever 31 is undepressed. While this invention has been illustrated in only one form it is obvious to one skilled in the art easy adaptability of the present invention to various air tools. A minumul number of parts is required. An operator can easily control reversal and speed of the present invention with one hand.

What I claim is:

1. An air motor reversing throttle comprising: a housing having a circumference and a center a, an air inlet counterbore in one end of said housing, a smaller diameter inlet counterbore communicating axially inward from said inlet counterbore, an air passage communicating angularly with said smaller diameter inlet counterbore wherein said air passage terminates at one end near said housing circumference and terminates at its other end by an air stoppage means at said housing circumference, a first air channel angularly communicating with said air passage near its terminated end, a second air channel angularly communicating with said air passage near its air stoppage end, a valve bore angularly communicating with both air channels and exposed at one end thereof at the circumference of said housing, a plunger guide bore providing communication between said smaller diameter inlet counterbore and said valve bore, an inlet member attached to the air inlet counterbore at said one end of said housing, a plunger having a large end and a sealing member attached annularly about its large end providing sealing means between said air inlet counterbore and said smaller diameter inlet counterbore and the other end of said plunger having a reduced diameter slidable through said plunger guide bore, a tension member tensioned against said inlet member at one end and said plunger at its opposite end, a valve slidable in said valve bore and having multiple air passages alignable with said air channels and each valve air passage radially offset to the center axis than each air channel, wherein movement of said valve toward said first air channel causes controlled alignment of a first valve air passage with said first air channel and movement of said valve toward said second air channel causes controlled alignment of a second valve air passage and said second air channel, a third air channel aligned with said first air channel and communicating at one end with said valve bore opposite said first air channel and its other end communicating with a first air chamber, said air chamber extending radially downward along the inside circumference of said housing, a fourth air channel aligned with said second air channel and communicating at one end with said valve bore opposite said second air channel and its other end in communication with a second air chamber extending radially upward along the opposite inside circumference of said housing from said first air chamber, said air chambers in non-communication with each other, said valve having plunger actuation means wherein movement of said valve in either direction causes perpendicular movement of said plunger away from said valve.

2. The combination defined in claim 1 wherein said housing has longitudinal holding means in alignment with an exposed end of said valve, said holding means pivotally accepting a throttle lever near their longitudinal centers, one end of said throttle lever pivotally linked to the exposed end of said valve, said housing having an exhaust means whereby exhausted air from an air motor exists said housing.

3. The combination in claim 1 wherein said valve air passages are positioned radially outward from said air channels.

* * * * *